(12) United States Patent
Senatro

(10) Patent No.: US 12,434,776 B2
(45) Date of Patent: *Oct. 7, 2025

(54) METHODS AND APPARATUS FOR A STRUT ASSEMBLY FOR AN AERODYNAMIC TRUCKING SYSTEM

(71) Applicant: FLEETAERO, LLC, Phoenix, AZ (US)

(72) Inventor: Richard P. Senatro, Scottsdale, AZ (US)

(73) Assignee: FLEETAERO, LLC, Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/639,150

(22) Filed: Apr. 18, 2024

(65) Prior Publication Data

US 2024/0262433 A1    Aug. 8, 2024

Related U.S. Application Data

(63) Continuation of application No. 18/310,019, filed on May 1, 2023, now Pat. No. 11,970,218, which is a continuation of application No. 17/505,207, filed on Oct. 19, 2021, now Pat. No. 11,639,205, which is a continuation-in-part of application No. 16/741,886, filed on Jan. 14, 2020, now Pat. No. 11,299,216, which is a continuation of application No. 15/958,342, filed on Apr. 20, 2018, now Pat. No. 10,583,873, which is a continuation of application No. 15/277,172, filed on Sep. 27, 2016, now Pat. No.

(Continued)

(51) Int. Cl.
*B62D 35/00* (2006.01)
*B62D 35/02* (2006.01)

(52) U.S. Cl.
CPC ......... *B62D 35/001* (2013.01); *B62D 35/008* (2013.01); *B62D 35/02* (2013.01); *Y02T 10/82* (2013.01); *Y02T 10/88* (2013.01); *Y10S 180/903* (2013.01)

(58) Field of Classification Search
CPC .. B62D 35/001; B62D 35/002; B62D 35/008; B62D 35/02; B62D 37/02
USPC .......... 296/180.1, 180.2, 180.3, 180.4, 191.2
See application file for complete search history.

(56) References Cited

U.S. PATENT DOCUMENTS 7,093,889 B2    8/2006    Graham
8,608,122 B2   12/2013    Mancina
(Continued)

*Primary Examiner* — Jason S Daniels
(74) *Attorney, Agent, or Firm* — Noblitt & Newson, PLLC

(57) ABSTRACT

A strut assembly for mounting an aerodynamic fairing assembly for attachment to a trailer of a tractor-trailer having a centerline, transverse structural support members extending between sides of the trailer, and longitudinal members extending along a length of the trailer. The strut assembly may comprise a mounting plate, a strut body, and a spring. The spring may be substantially rectangular. The mounting bracket comprising a mounting plate and a pair of spaced apart sidewalls. The strut body rotatably may be coupled to the pair of spaced apart sidewalls on the mounting bracket. The spring may be coupled to an upper surface of the strut body and configured to contact an underside of the mounting plate of the mounting bracket to resist inward deflection from an external force applied to the strut body.

22 Claims, 13 Drawing Sheets

Related U.S. Application Data 9,975,583, which is a continuation of application No. 14/935,647, filed on Nov. 9, 2015, now Pat. No. 9,751,573, which is a continuation of application No. 14/247,504, filed on Apr. 8, 2014, now Pat. No. 9,211,919, which is a continuation of application No. 13/633,013, filed on Oct. 1, 2012, now Pat. No. 8,727,425, which is a continuation-in-part of application No. 13/117,891, filed on May 27, 2011, now Pat. No. 8,303,025.

(60) Provisional application No. 61/639,830, filed on Apr. 27, 2012, provisional application No. 61/374,572, filed on Aug. 17, 2010, provisional application No. 61/349,183, filed on May 27, 2010.

(56) References Cited

U.S. PATENT DOCUMENTS

| | | | |
|---|---|---|---|
| 10,994,791 B2 | 5/2021 | Bradley | |
| 11,639,205 B2 * | 5/2023 | Senatro | B62D 35/02 296/180.4 |
| 2003/0057736 A1 | 3/2003 | Long | |
| 2010/0098481 A1 | 4/2010 | Bolvin | |
| 2010/0264691 A1 | 10/2010 | Giromini | |
| 2011/0062749 A1 | 3/2011 | Graham | |
| 2011/0233960 A1 | 9/2011 | Heinz | |
| 2011/0285167 A1 | 11/2011 | Butler | |
| 2012/0091754 A1 | 4/2012 | Lee | |

* cited by examiner

METHODS AND APPARATUS FOR A STRUT ASSEMBLY FOR AN AERODYNAMIC TRUCKING SYSTEM

CROSS-REFERENCES TO RELATED APPLICATIONS

The present application is a continuation of U.S. Nonprovisional patent application Ser. No. 18/310,019, now U.S. Pat. No. 11,970,218, filed May 1, 2023, entitled "METHODS AND APPARATUS FOR A STRUT ASSEMBLY FOR AN AERODYNAMIC TRUCKING SYSTEM, which is a continuation of U.S. Nonprovisional patent application Ser. No. 17/505,207, now U.S. Pat. No. 11,639,205, filed Oct. 19, 2021 entitled "METHODS AND APPARATUS FOR A STRUT ASSEMBLY FOR AN AERODYNAMIC TRUCKING SYSTEM, which is a continuation-in-part of U.S. Nonprovisional patent application Ser. No. 17/706,909, filed Mar. 29, 2022 entitled "AERODYNAMIC TRUCKING SYSTEMS", which is a continuation of U.S. Nonprovisional patent application Ser. No. 16/741,886, now U.S. Pat. No. 11,299,216, filed Jan. 14, 2020, entitled "AERODYNAMIC TRUCKING SYSTEMS", which is a continuation of U.S. Nonprovisional patent application Ser. No. 15/958,342, now U.S. Pat. No. 10,583,873, filed Apr. 20, 2018 entitled "AERODYNAMIC TRUCKING SYSTEMS", which is a continuation of U.S. Nonprovisional patent application Ser. No. 15/277,172, now U.S. Pat. No. 9,975,583 filed Sep. 27, 2016 entitled "AERODYNAMIC TRUCKING SYSTEMS", which is a continuation of U.S. Nonprovisional patent application Ser. No. 14/935,647 filed Nov. 9, 2015, now U.S. Pat. No. 9,751,573 entitled "AERODYNAMIC TRUCKING SYSTEMS", which is a continuation of U.S. Nonprovisional patent application Ser. No. 14/247,504, filed Apr. 8, 2014, now U.S. Pat. No. 9,211,919 entitled "AERODYNAMIC TRUCKING SYSTEMS", which is a continuation of U.S. Nonprovisional patent application Ser. No. 13/633,013 filed Oct. 1, 2012, now U.S. Pat. No. 8,727,425 entitled "AERODYNAMIC TRUCKING SYSTEMS", which claims the benefit of U.S. Provisional Application Ser. No. 61/639,830, filed Apr. 27, 2012 entitled "AERODYNAMIC TRUCKING SYSTEMS"; and is a continuation-in-part of U.S. Nonprovisional patent application Ser. No. 13/117,891 filed May 27, 2011, now U.S. Pat. No. 8,303,025 entitled "AERODYNAMIC TRUCKING SYSTEMS", which claims the benefit of U.S. Provisional Application Ser. No. 61/374,572, filed Aug. 17, 2010, entitled "AERODYNAMIC TRUCKING SYSTEMS"; and, which claims the benefit of U.S. Provisional Application Ser. No. 61/349,183, filed May 27, 2010, entitled "AERODYNAMIC TRUCKING SYSTEMS"; and incorporates the disclosure of each application by reference. To the extent that the present disclosure conflicts with any referenced application, however, the present disclosure is to be given priority.

BACKGROUND OF THE TECHNOLOGY

This technology relates to aerodynamic trucking systems. More particularly, this technology relates to providing a system of aerodynamic apparatus configured to minimize aerodynamic drag and maintain smoother air flow over highway-operated vehicles, particularly long-haul tractor-trailer vehicles.

Most large long-haul cargo trailers exhibit less than optimal aerodynamic performance during highway operation. At highway speeds, conventional trailers develop a substantial amount of turbulent airflow in the region between the axles below the trailer box. This turbulence results in significant aerodynamic drag, increasing both fuel consumption and Nitrogen Oxide (NOX) emissions at the motorized towing vehicle. Additionally, temporarily sustained vibration of external vehicle surfaces due to transient wind-force loading is often associated with premature wear, noise, and early failures within such aerodynamic vehicle structures. A system and method to improve the aerodynamic performance of long-haul transport vehicles in the above-noted areas is described below.

SUMMARY OF THE PRESENT TECHNOLOGY

A strut assembly for mounting an aerodynamic fairing assembly for attachment to a trailer of a tractor-trailer having a centerline, transverse structural support members extending between sides of the trailer, and longitudinal members extending along a length of the trailer. The strut assembly may comprise a mounting plate, a strut body, and a substantially rectangular composite spring. The mounting bracket comprising a mounting plate and a pair of spaced apart sidewalls. The strut body rotatably may be coupled to the pair of spaced apart sidewalls on the mounting bracket. The substantially rectangular composite spring may be coupled to an upper surface of the strut body and configured to contact an underside of the mounting plate of the mounting bracket to resist inward deflection from an external force applied to the strut body.

BRIEF DESCRIPTION OF THE DRAWINGS

A more complete understanding of the present technology may be derived by referring to the detailed description when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in a different order are illustrated in the figures to help to improve understanding of embodiments of the present technology.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various types of materials, connectors, panel, mounts, and the like for aerodynamic trucking systems, and the system described is merely one exemplary application for the technology.

Methods and apparatus for providing a safety system designed to minimize internal deflection of a side skirt on a trailer when side impact from an automobile or other road vehicle occurs. Various representative implementations of the present technology may be applied to any system for minimizing internal deflection of a side skirt on a trailer upon side impact from an automobile or other road vehicle. The present technology may be utilized to minimize internal deflection of a side skirt on a trailer upon side impact from an automobile or other road vehicle so as to limit a vehicles ability to slide underneath a semi-truck trailer when a crash occurs.

Generally, an undercarriage of a conventional cargo trailer is comprised of groupings of various components, which generally reside below a cargo-supporting floor deck, customarily having a rectangular shape. The components of a semi-type cargo trailer undercarriage customarily include longitudinal and transverse structural support members. An aerodynamic skirt fairing may be mounted to an undercarriage of a cargo trailer by a panel support or strut assembly. The aerodynamic skirt fairing may be mounted directly to the any portion of the undercarriage of the cargo trailer by any known method. The aerodynamic skirt fairing functions to direct airflow away from the central regions of the trailer undercarriage to reduce drag. A conventional cargo trailer is shown and described in FIGS. 1 and 8 of US Patent Publication No. US-2020-0148288-A1, which is incorporated by reference.

Figure 1:
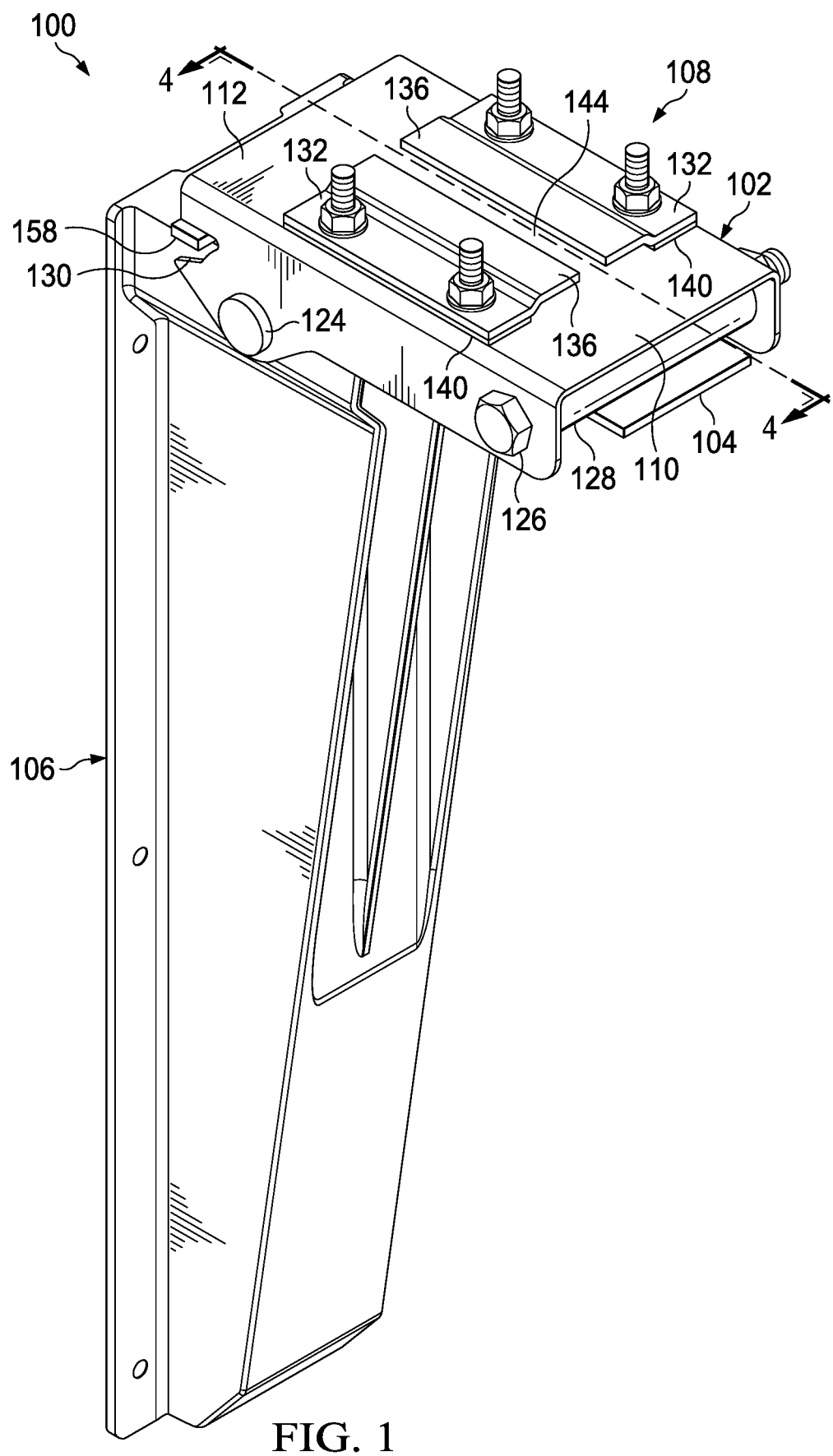
FIG. 1 representatively illustrates a perspective view of a strut assembly in accordance with various embodiments.
Figure 2:
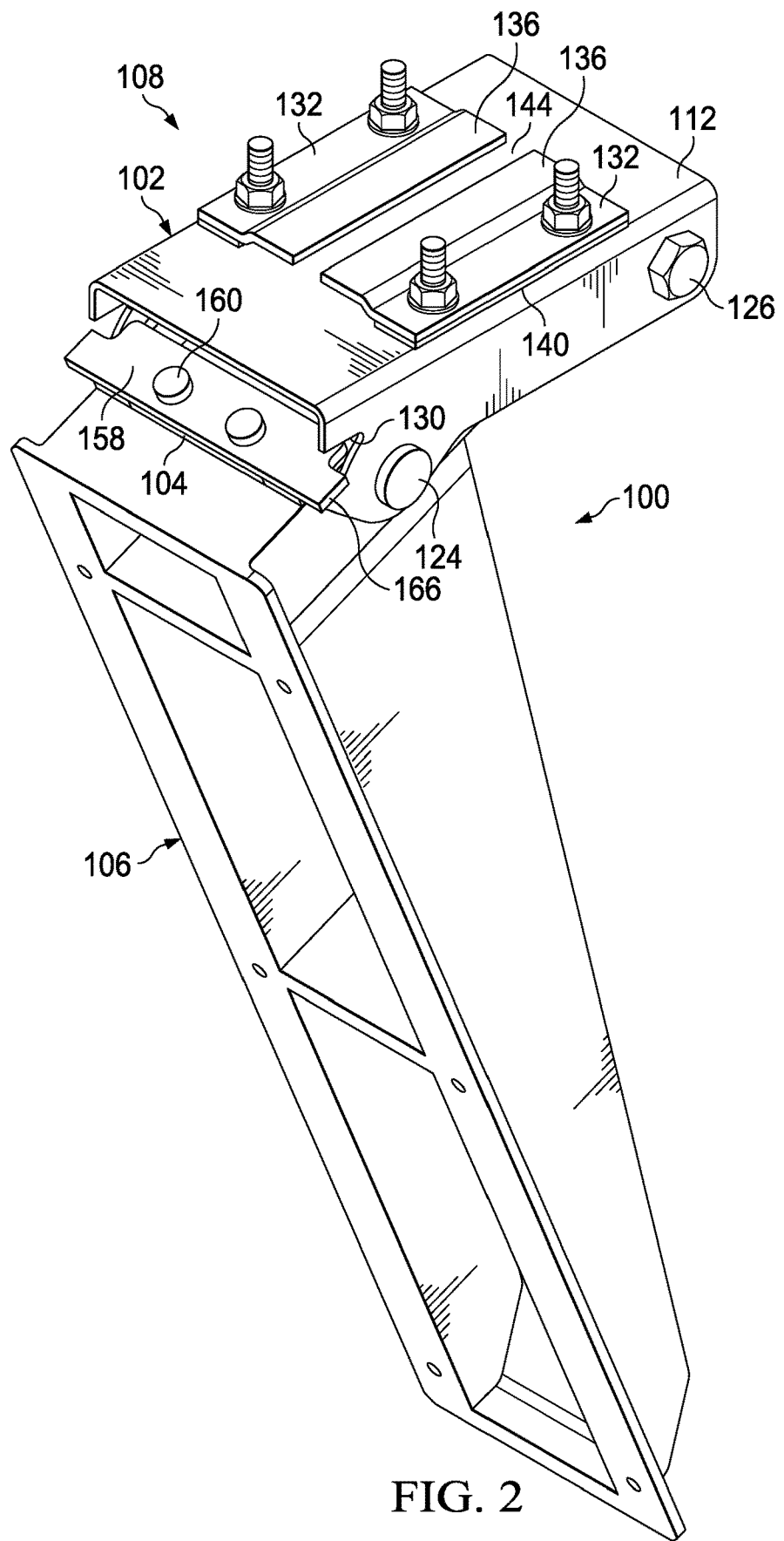
FIG. 2 representatively illustrates a perspective view of a strut assembly in a deflected position in accordance with various embodiments.
Figure 3:
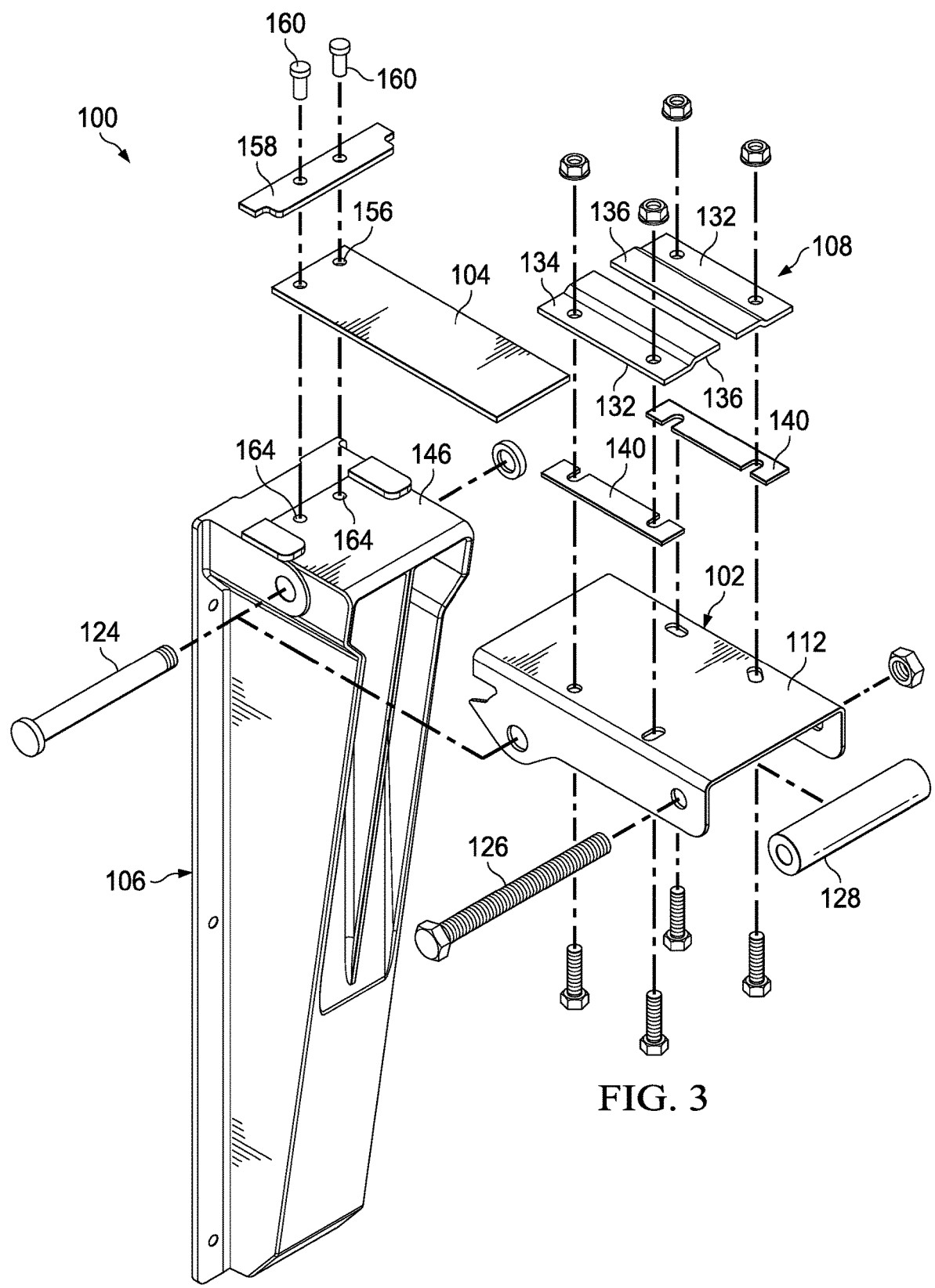
FIG. 3 representatively illustrates an exploded perspective view of a strut assembly in accordance with various embodiments, FIG. 4 representatively illustrates a cross section view take along the line 4-4 in accordance with various embodiments.

In accordance with various embodiments and referring now to FIGS. 1-4, a strut assembly will 100 be discussed. Generally, the strut assembly 100 may be coupled to a semi-type cargo trailer undercarriage (not shown) to restrict movement of the aerodynamic skirt fairing inwardly if impacted by an automobile, motorcycle, or other object. Further, the strut assembly 100 may be coupled to one of a longitudinal structural support member and/or transverse structural support member of the undercarriage to restrict movement of the aerodynamic skirt fairing inwardly if impacted. FIGS. 1 and 3 show the strut assembly 100 in the standard operating position while FIG. 2 shows the strut assembly 100 in a deflected position.

In various embodiments, the strut assembly 100 may comprise a mounting bracket 102, a spring 104, and a strut body 106. The strut body 106 may be rotatably coupled to the mounting bracket 102. The spring 104 may be coupled to the mounting bracket 102 and configured to resist inward rotation of the strut body 106 toward a longitudinal centerline of the trailer upon impact from an automobile or any other foreign object.

In various embodiments, the strut assembly 100 may be rotatably coupled to the undercarriage of a cargo trailer. In another embodiment, the strut assembly 100 may be rotatably coupled to one of the longitudinal and/or transverse structural support members.

Each of the components may be constructed from industry-standard materials selected to comprise a structural rigidity sufficient to support the required air deflection function, while offering a level of mechanical flexibility sufficient to deflect resiliently under small to moderate impact loads, thereby reducing the need for repair or replacement due to permanent impact damage. Materials suitable for use in the strut assembly 100 may comprise, such as, for example, steel, stainless steel, aluminum, composite materials, UHDPE, molded polymer, polymer-based composite, fiber-reinforced polymer, and injection molded polycarbonate, acrylonitrile butadiene styrene ("ABS") plastic, polypropylene, polyethylene, and polystyrene, polyvinyl chloride ("PVC") or any suitable combination or mixture thereof. In one embodiment, the material for the strut assembly 100 may comprise an injection molded mixture of polycarbonate and ABS plastic. One of ordinary skill in the art will appreciate that, under appropriate circumstances, considering such issues as cost, user preference, etc., other material selections for the strut assembly 100 may be used.

Figure 9A:
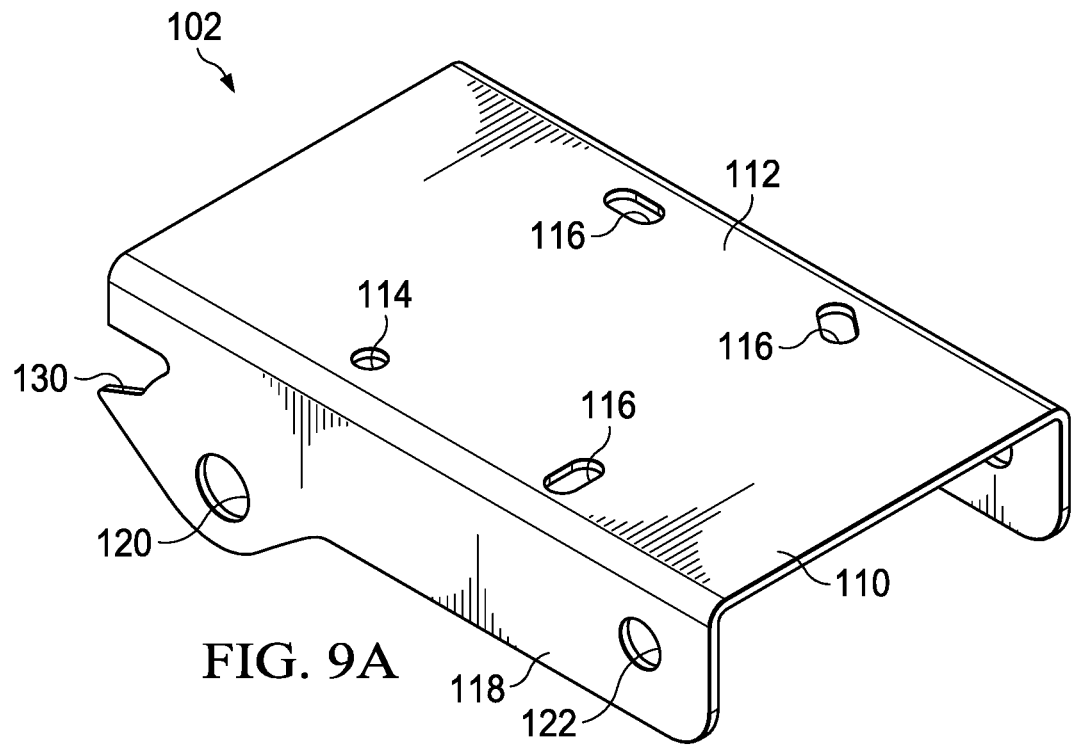
FIG. 9A representatively illustrates a perspective view of a mounting bracket in accordance with various embodiments.
Figure 9B:
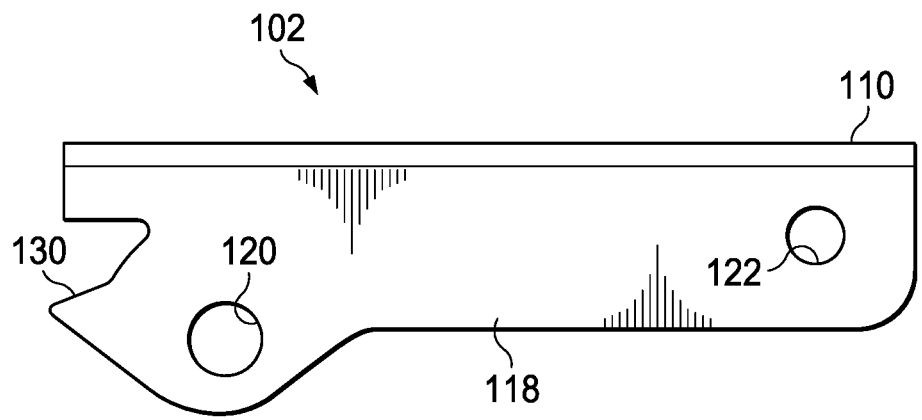
FIG. 9B representatively illustrates a side view of a mounting bracket in accordance with various embodiments.
Figure 10A:
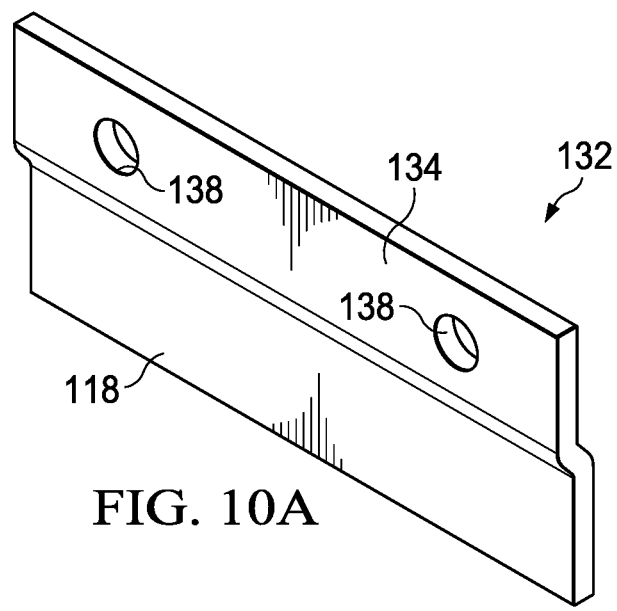
FIG. 10A representatively illustrates a perspective view of a mounting clamp in accordance with various embodiments.
Figure 10B:
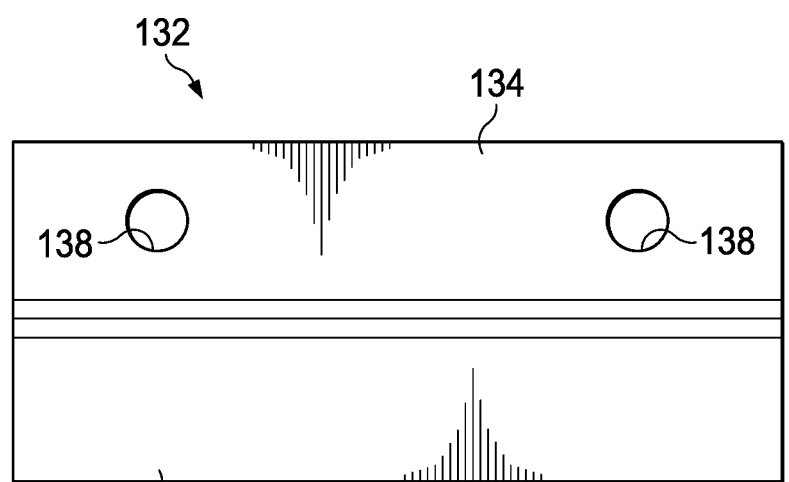
FIG. 10B representatively illustrates a top view of a mounting clamp in accordance with various embodiments.
Figure 10C:
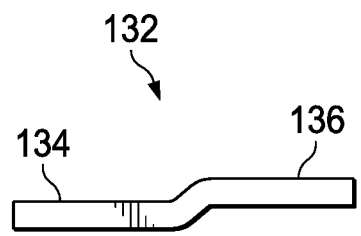
FIG. 10C representatively illustrates a side view of a mounting clamp in accordance with various embodiments.
Figure 11A:
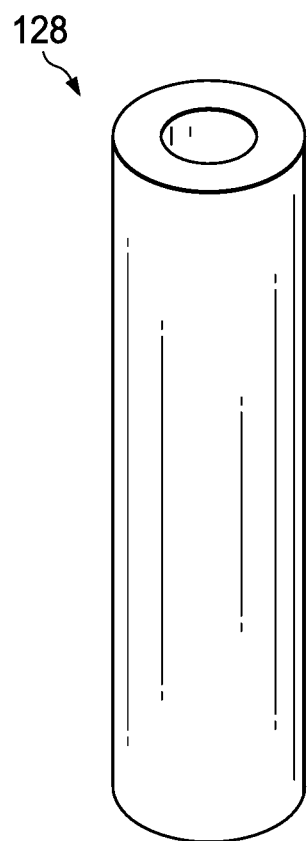
FIG. 11A representatively illustrates a perspective view of a roller in accordance with various embodiments.
Figure 11B:
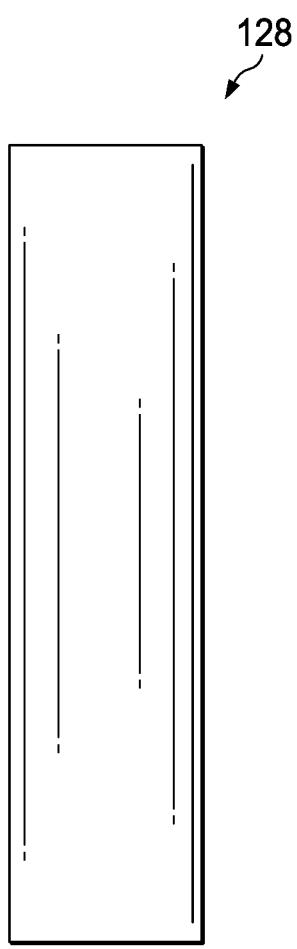
FIG. 11B representatively illustrates a top view of a roller in accordance with various embodiments.
Figure 11C:
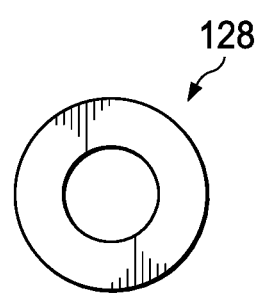
FIG. 11C representatively illustrates an end view of a roller in accordance with various embodiments.

In various embodiments, as shown in FIGS. 1 and 9A-B, the mounting bracket 102 may be coupled to one of the longitudinal and/or transverse structural support members by a clamping mechanism 108. In various embodiments, the mounting bracket 102 may be made steel, stainless steel, alloy steel, carbon steel, chromoly, aluminum, various composite materials and the like.

In various embodiments, as shown in FIGS. 9A-B the mounting bracket 102 may comprise a mounting plate 110. The mounting plate 110 may comprise a central portion 112 containing a positional adjuster comprising an aperture 114 and at least one slotted aperture 116. In one embodiment, the positional adjuster of the mounting plate 110 may comprise a single circular aperture 114 and multiple slotted apertures 116. The apertures 114, 116 are configured to assist with the mounting of the strut assembly 100 to one of the longitudinal and/or transverse structural support members. The apertures 116 may be slotted or curved to assist with the mounting of the strut assembly 100 to the trailer.

The mounting plate 110 may comprise a pair of opposed sidewalls 118 configured to couple the strut body 106 to the mounting bracket 102. The opposed sidewalls 118 project downwardly from the mounting plate 102. The sidewalls 118 may comprise a pair of forward apertures 120 and a pair of rear apertures 122. The forward apertures may receive a pin 124 to couple the strut body 106 to the mounting bracket 102. The rear apertures 122 may receive a fastener 126 to couple a roller 128 to the mounting bracket 102.

In one embodiment, the sidewalls 118 each contain an angled notch 130. The angled notch 130 serves to limit the rotation of the strut body 106 inwardly towards a centerline of the trailer upon impact from a foreign member.

Figure 7A:
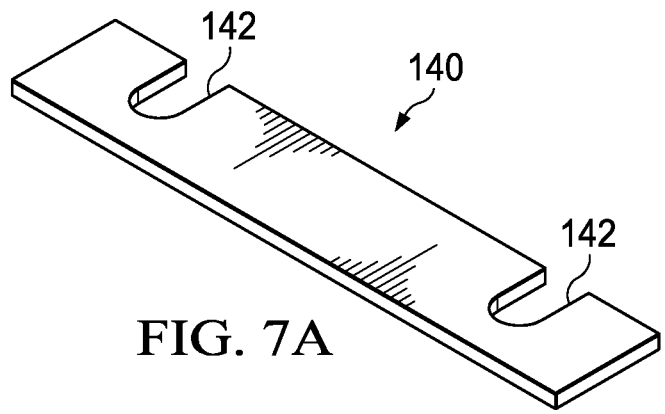
FIG. 7A representatively illustrates a perspective view a spacer in accordance with various embodiments.
Figure 7B:
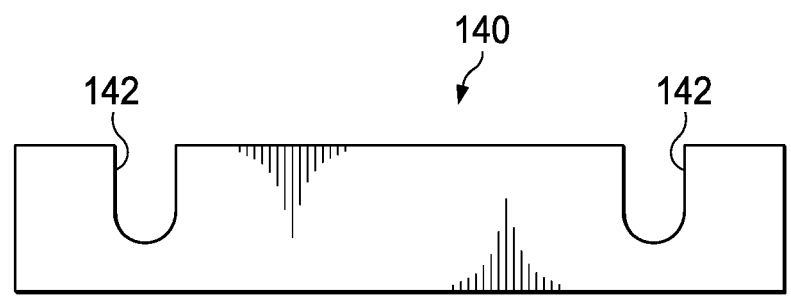
FIG. 7B representatively illustrates a top view a spacer in accordance with various embodiments.
Figure 7C:
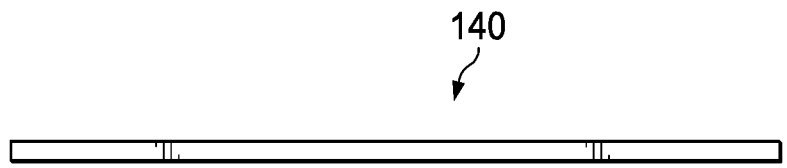
FIG. 7C representatively illustrates a front view a spacer in accordance with various embodiments.

In various embodiments, as shown in FIGS. 1-3, the mounting bracket 102 may be configured to be adjustably mounted to a transverse structural support member of a cargo trailer by the clamping mechanism 108. The clamping mechanism 108 along with the mounting bracket 102 may be configured to be adjustable along multiple linear and rotational axes to facilitate the above-noted optimized aerodynamic positioning of respective aerodynamic skirt fairings mounted to the strut assembly 100 within a specific tractor-trailer setup. The clamping mechanism 108 and positional adjuster of the mounting plate 110 comprising the apertures 114, 116 allow the mounting bracket 102 to be adjustable in multiple directions. Another example is shown and described in FIG. 7 of US Patent Publication No. US-2020-0148288-A1, which is incorporated by reference.

In various embodiments, referring to FIGS. 1, 3, and 10A-10C, the clamping mechanism 108 may comprise a pair of spaced apart clamps 132. The clamps 132 may comprise a mounting portion 134 and a raised portion 136. The mounting portion 134 may comprise a pair of apertures 138, which align with the apertures on the positional adjuster on the mounting plate 110 of the mounting bracket 102.

In one embodiment, when coupled to the mounting bracket 102, a clamp spacer 140, shown in FIGS. 3 and 7A-C is placed between the mounting bracket 102 and the clamping mechanism 108. The clamp spacer 140 may comprise a pair of cutout portions 142, that generally align with the apertures 138 on the mounting porting 134 of the clamps 132 and the apertures 114, 116. The raised portion 136 of the clamps 132 and the clamp spacer 140, when assembled create a mounting channel 144. The mounting channel 144 may comprise a space between a lower surface of the raised portion 136 and the central portion 112 of the mounting bracket 102 and may be configured to receive one of the longitudinal and/or transverse structural support members on the trailer.

Figure 5A:
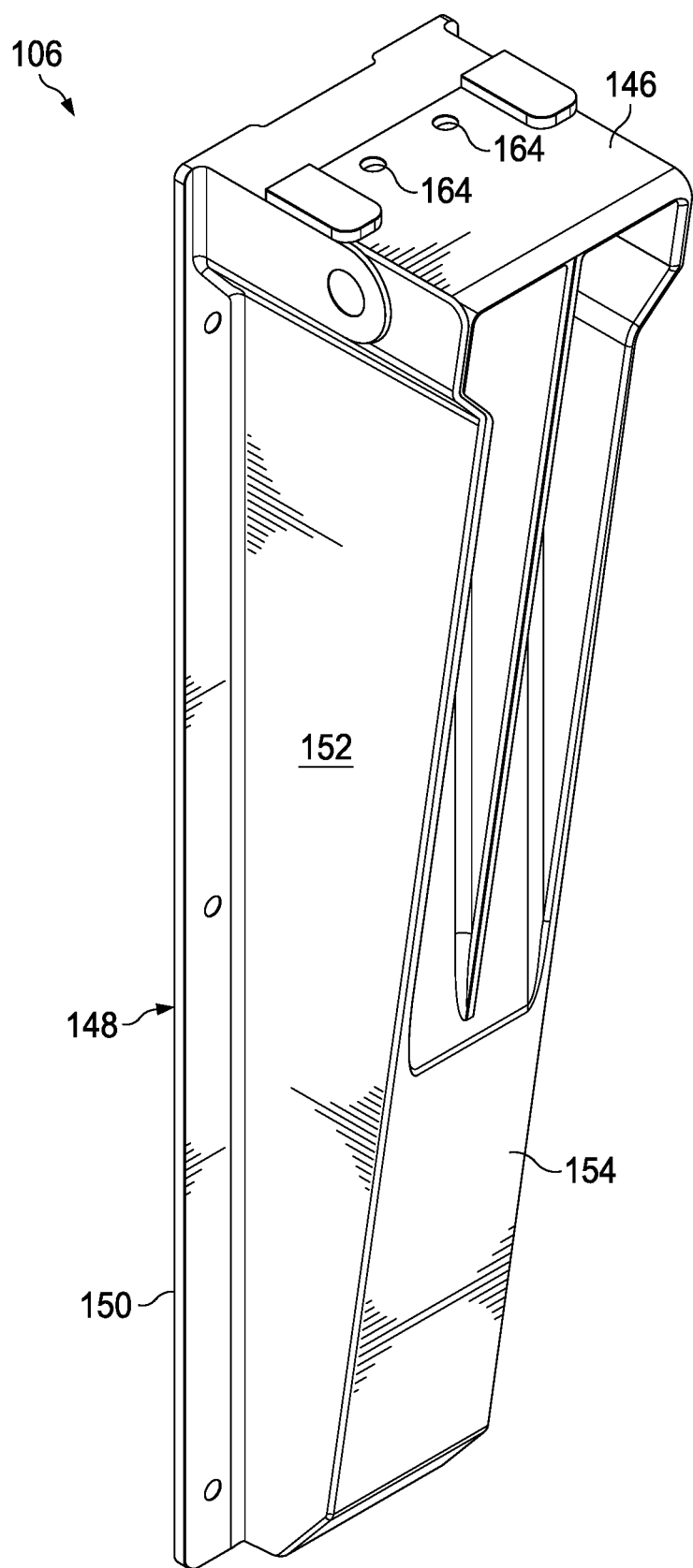
FIG. 5A representatively illustrates a perspective view of a body of the strut assembly in accordance with various embodiments.
Figure 5B:
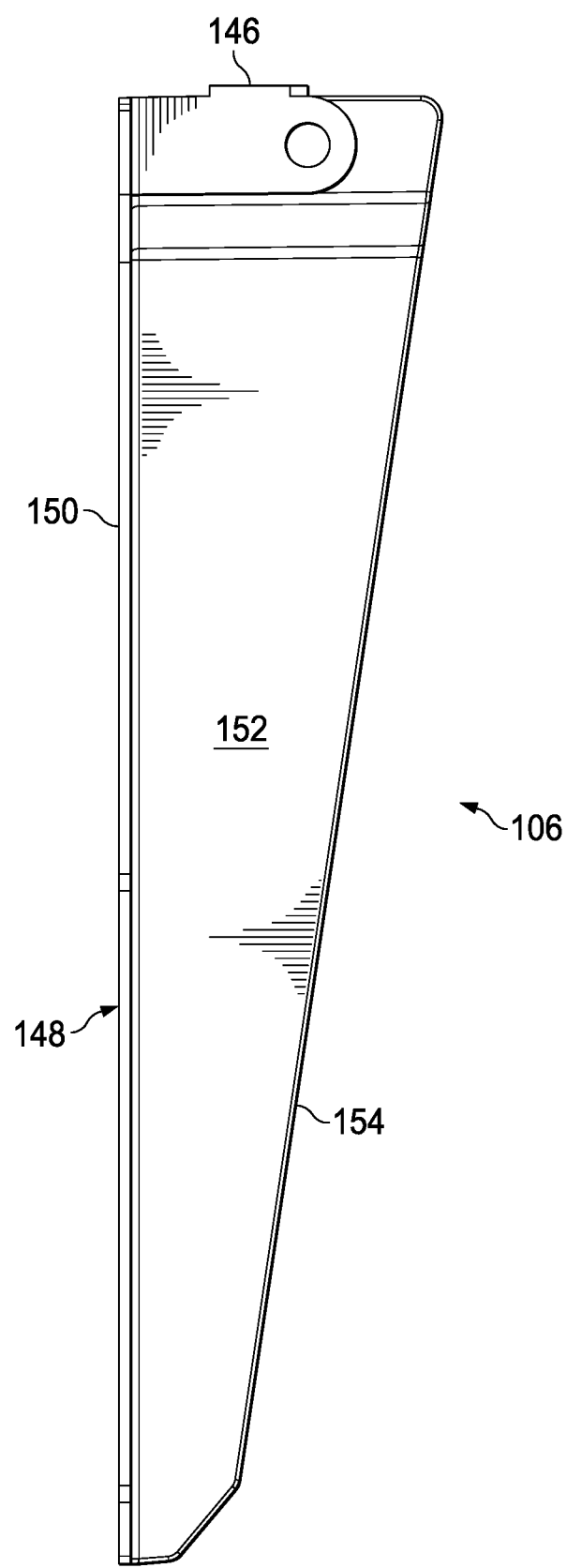
FIG. 5B representatively illustrates a side view of a body of the strut assembly in accordance with various embodiments.
Figure 5C:
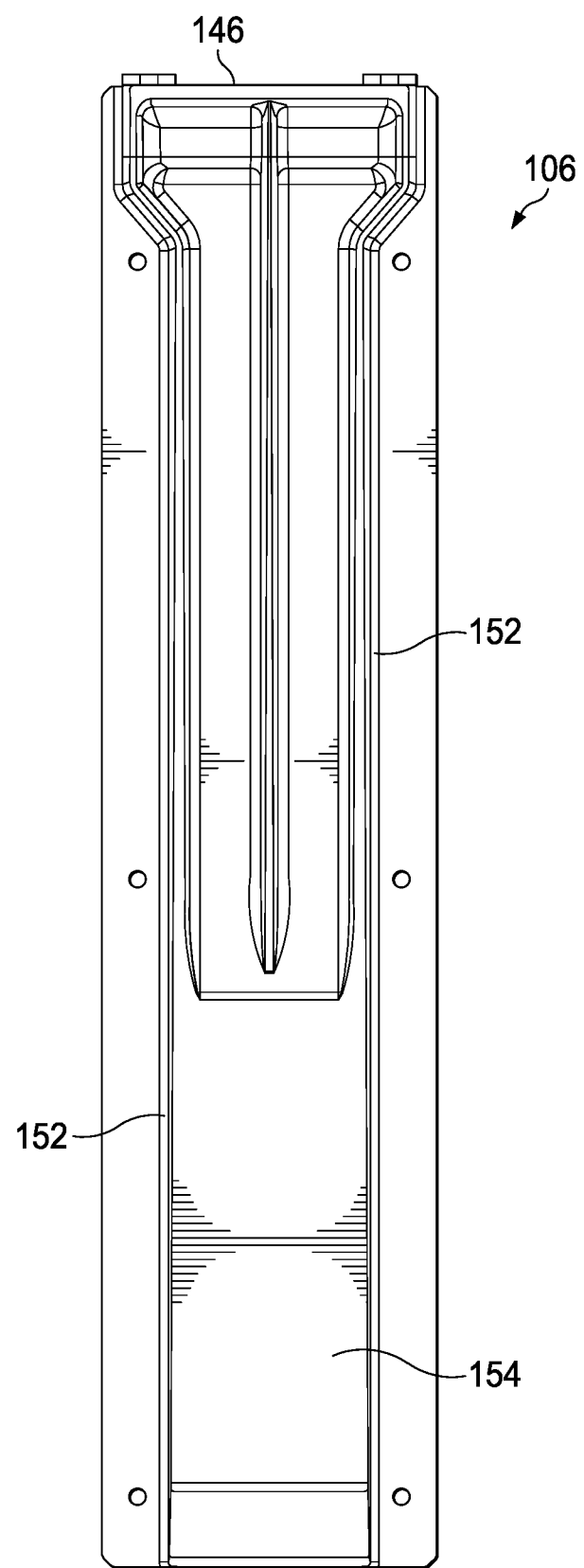
FIG. 5C representatively illustrates a rear view of a body of the strut assembly in accordance with various embodiments.
Figure 6:
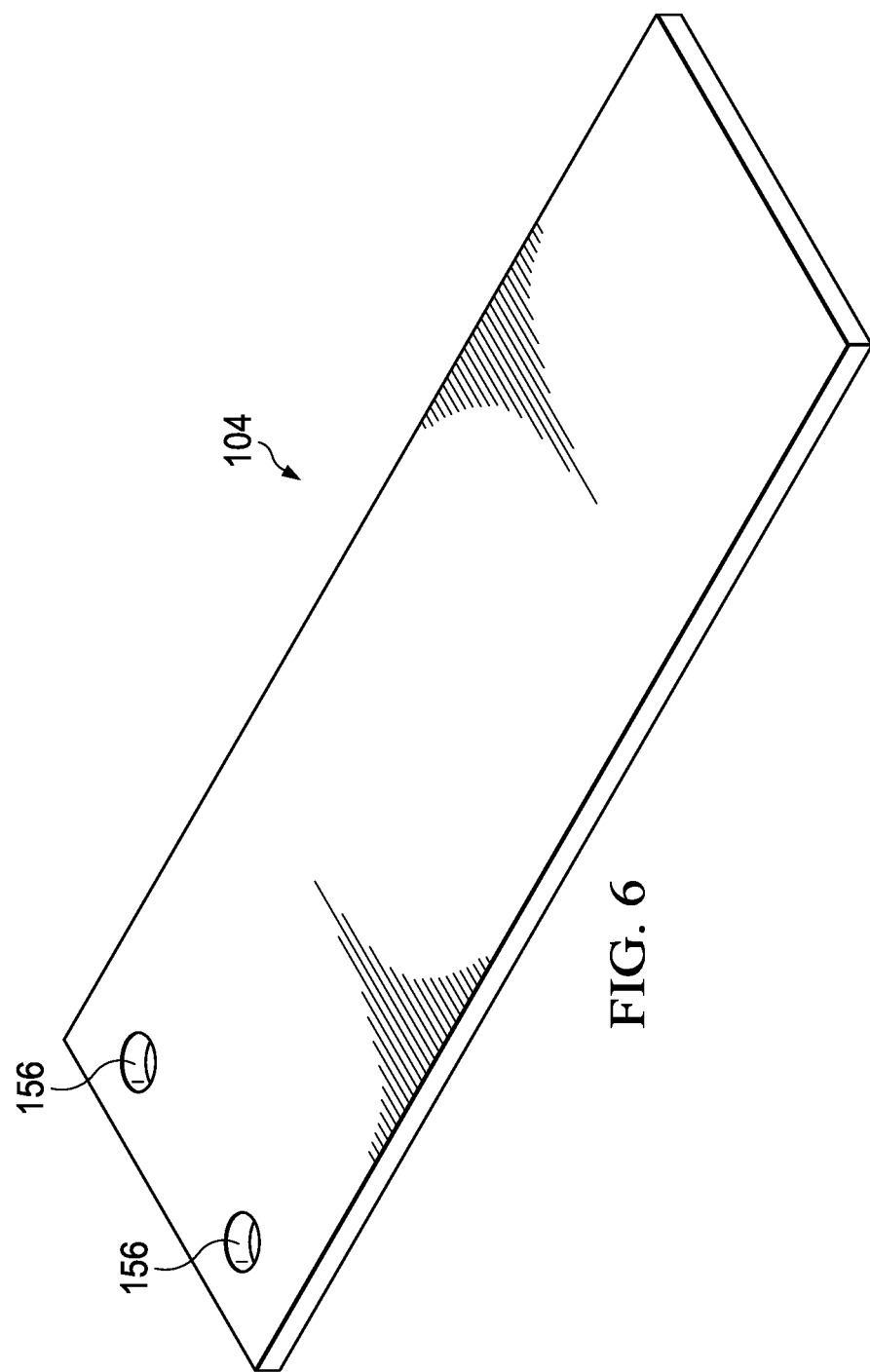
FIG. 6 representatively illustrates a perspective view a spring in accordance with various embodiments.

In various embodiments, and referring to FIG. 5A-C, the strut body 106 may comprise a mounting surface 146 and a panel support 148. The mounting surface 146 is a generally horizontal surface used to couple the strut body 106 to the spring 104.

The panel support 148 may comprise a downwardly-projecting support member 150 pivotally coupled to the mounting bracket 102, which is coupled to the transverse structural support member on the cargo trailer (not shown). The downwardly-projecting support member 150 of the strut body 106 may comprise a pair of spaced apart side walls 152, each having a mounting aperture located at an upper end and a rear wall 154 which is configured to sturdy the strut body 106 to support the mounting of a side skirt panel.

In various embodiments, the strut body 106 may be made from any suitable material that would resist side impact. Some examples include steel, stainless steel, alloy steel, carbon steel, chromoly, aluminum, composite materials, UHDPE, molded polymer, polymer-based composite, fiber-reinforced polymer, and injection molded polycarbonate, acrylonitrile butadiene styrene ("ABS") plastic, polypropylene, polyethylene, and polystyrene, polyvinyl chloride ("PVC") or any suitable combination or mixture thereof. In one embodiment, the material for the strut body 106 may comprise an injection molded mixture of polycarbonate and ABS plastic.

Referring now to FIGS. 1, 3, 4 and 6, the spring 104 will be discussed. The spring 104 may be from a fabric material and is configured to resist movement of the strut body 106 inwardly upon deflection from an external impact. In one embodiment the fabric spring may comprise a Gordon Spring, manufactured by Gordon Holdings. In various embodiments, the spring 104 may be constructed from an advanced composite material comprising vinyl Ester or epoxy resins and unidirectional fiber reinforcement technologies. Some combinations include glass/vinyl ester and/or glass/epoxy. In various embodiments, the spring 104 may comprise a composite spring. These formulations achieve long-lasting, consistent flexing performance in a variety of applications. Composite springs (also referred to as flat springs, flippers, energizers, slats, and exciters) are engineered with proprietary vinyl ester or epoxy resins and unidirectional glass or carbon fiber reinforcement technologies. These formulations achieve long-lasting, deep, and consistent flexing performance in a variety of cantilevered applications, from vibratory sorting and conveying systems to furniture. Still further, applications requiring high cyclic fatigue resistance, repeatability, and high performance are well served by composite springs. The types of materials for the fabric spring are similar to those made from PolyOne Corporation and/or Avient Corporation https://healthcare-.polyone.com/products/advanced-composites/pultrusion-and-continuous-filament-winding-technology/advanced-composite-springs.

Figure 4:
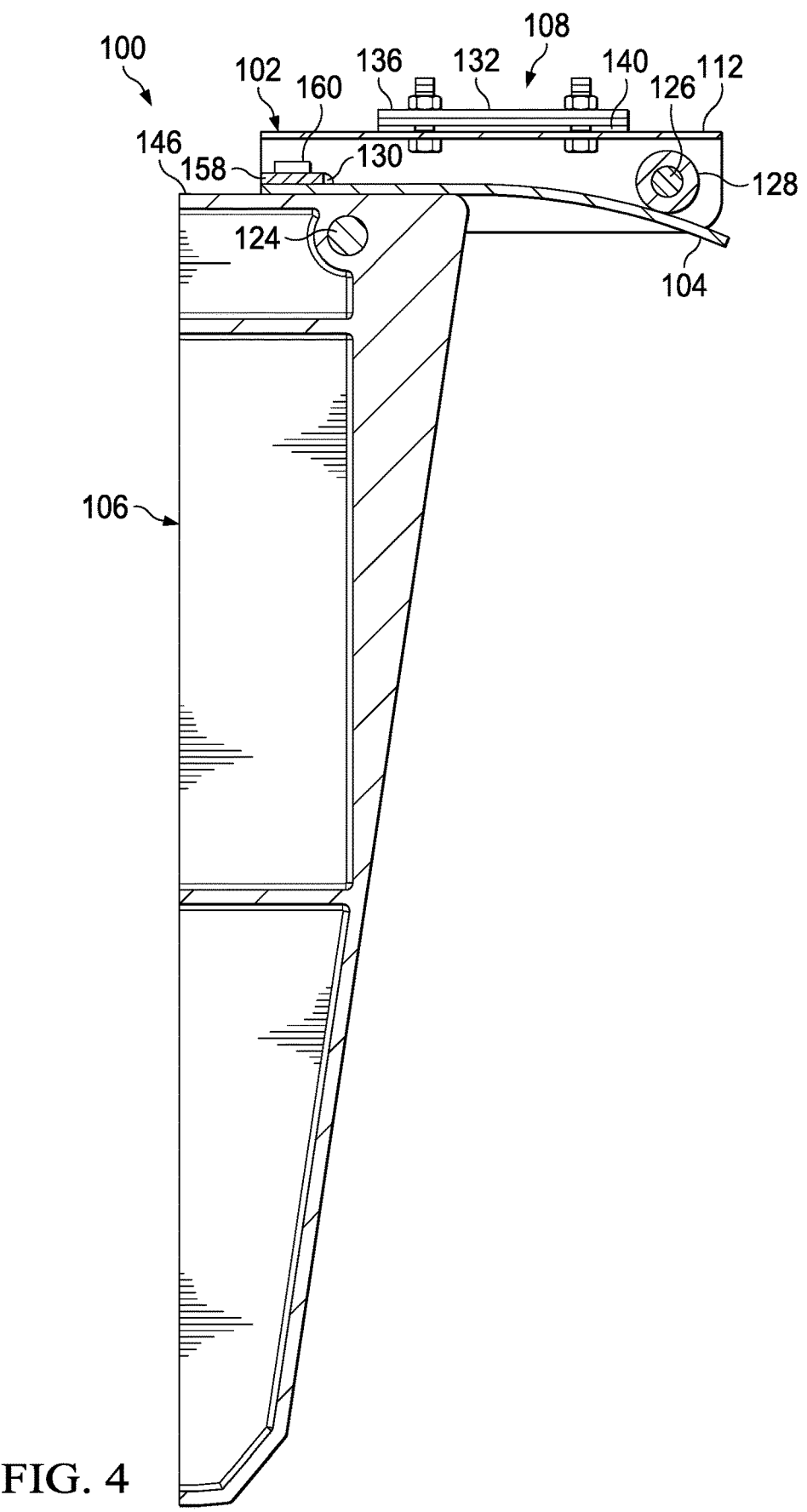

The spring 104 comprises a pair of apertures 156 located adjacent a first end. The spring 104 is generally rectangular shaped and flat, although any suitable shape and configuration may be used depending on the configuration of the other components. The spring 104 is mounted between the lower surface of the mounting bracket 102 and the mounting surface 146 of the strut body 106. In one embodiment, and as shown in FIGS. 3 and 4, the spring 104 is coupled to the mounting surface 146 of the strut body 106 by a spring washer 158 (FIGS. 8A-B) at a first end. The spring 104 may be received between the spring washer 158 and the mounting surface 146 of the strut body 106 and coupled there between by fasteners 160. The fasteners 160 are received in apertures 156 on the spring 104, apertures 162 on the spring washer 140, and apertures 164 on the mounting surface 146 of the strut body 106.

A second end of the spring 106 is configured to slide on an underside of the roller 128, when deflected. The roller 128, shown in FIGS. 12A-C, may be made from any suitable low friction material comprising composite materials, UHDPE, molded polymer, polymer-based composite, fiber-reinforced polymer, and injection molded polycarbonate, acrylonitrile butadiene styrene ("ABS") plastic, polypropylene, polyethylene, and polystyrene, polyvinyl chloride ("PVC") or any suitable combination or mixture thereof.

Figure 8A:
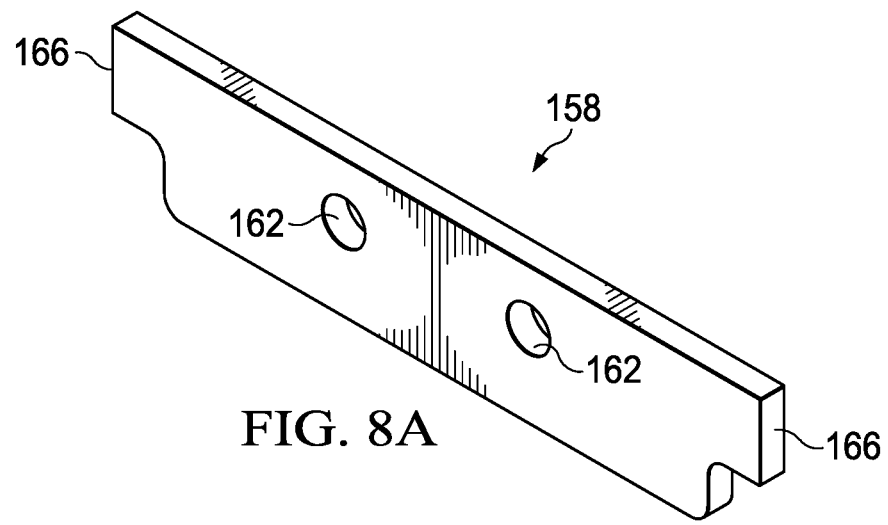
FIG. 8A representatively illustrates a perspective view of a spring washer in accordance with various embodiments.
Figure 8B:
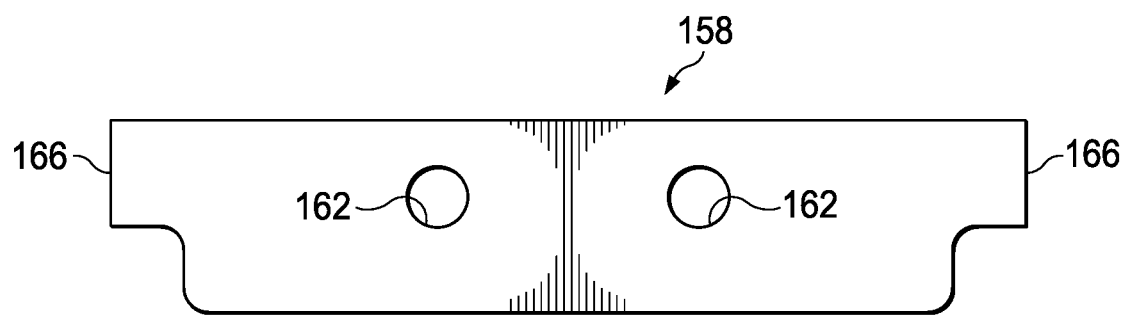
FIG. 8B representatively illustrates a top view of a spring washer in accordance with various embodiments.

Referring now to FIGS. 8A-C, the spring washer 158 may comprise a protrusion 166 that is received within the angled notch 130 on the mounting bracket 102. The angled notch 130 serves to limit the rotation of the strut body 106 inwardly towards a centerline of the trailer upon impact from a foreign member. The notch 130 only allows the strut body 106 to be deformed by a specific amount due to the configuration of the protrusion 166 contained therein.

In operation, the spring 104 along with the protrusion 166 and angled notch 130 serve to limit the rotation of the strut body 106 with respect to the mounting bracket 102. Upon deflection, the strut body 106 is moved inwardly and upwardly. Rotation continues until the protrusion 166 contacts the angled notch 130. The mounting surface 146 of the strut body 106 contacts the spring 104, which restricts the movement of the strut body 106 along with the protrusion 166 and angled notch 130. The spring 104 provides resistance while the protrusion 166 and angled notch 130 provide a hard stop.

In the foregoing description, the technology has been described with reference to specific exemplary embodiments. Various modifications and changes may be made, however, without departing from the scope of the present invention as set forth. The description and figures are to be regarded in an illustrative manner, rather than a restrictive one and all such modifications are intended to be included within the scope of the present invention. Accordingly, the scope of the technology should be determined by the generic embodiments described and their legal equivalents rather than by merely the specific examples described above. For example, the steps recited in any method or process embodiment may be executed in any appropriate order and are not limited to the explicit order presented in the specific examples. Additionally, the components and/or elements recited in any system embodiment may be combined in a variety of permutations to produce substantially the same result as the present invention and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

As used herein, the terms "comprises," "comprising," or any variation thereof, are intended to reference a non-exclusive inclusion, such that a process, method, article, composition or apparatus that comprises a list of elements does not include only those elements recited but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same. Any terms of degree such as "substantially," "about," "generally," and "approximate" as used herein mean a reasonable amount of deviation of the modified term such that the end result is not significantly changed. For example, these terms can be construed as including a deviation of at least ±5% of the modified term if this deviation would not negate the meaning of the word it modifies.

The present technology has been described above with reference to an exemplary embodiment. However, changes and modifications may be made to the exemplary embodiment without departing from the scope of the present technology. These and other changes or modifications are intended to be included within the scope of the present technology.

What is claimed:

1. A strut assembly for mounting an aerodynamic fairing assembly for attachment to a trailer of a tractor-trailer having a centerline, transverse structural support members extending between sides of the trailer, and longitudinal members extending along a length of the trailer, the strut assembly comprising:
   a mounting bracket;
   a strut body rotatably coupled to the mounting bracket; and
   a spring coupled to an upper surface of the strut body and configured to engage an underside of the mounting bracket to resist inward deflection from an external force.

2. The strut assembly of claim 1, wherein the mounting bracket is coupled to one or more of the transverse structural support members by a clamping mechanism.

3. The strut assembly of claim 2, wherein the clamping mechanism comprises a pair of spaced apart clamping plates each having a mounting portion and a raised portion, wherein the mounting portion is coupled to a mounting plate of the mounting bracket and the transverse structural support members are received within a channel between the raised portion of the clamping plates and an upper surface of the mounting plate to couple the strut assembly to the trailer.

4. The strut assembly of claim 1, wherein the mounting bracket comprises a mounting plate and a pair of spaced apart sidewalls.

5. The strut assembly of claim 4, wherein the strut body is rotatably coupled to the pair of spaced apart sidewalls on the mounting bracket.

6. The strut assembly of claim 4, wherein the pair of spaced apart sidewalls of the mounting bracket contain a pair of forward apertures and a pair of rear apertures; wherein:
   the pair of forward apertures are configured to rotatably couple the strut body to the mounting bracket with a fastener; and
   the pair of rear apertures are configured to couple a roller to the mounting bracket with a fastener, wherein an upper surface of the spring contacts a lower surface of the roller.

7. The strut assembly of claim 6, wherein each of the pair of spaced apart sidewalls contain an angled notch at a forward end of the mounting bracket.

8. The strut assembly of claim 7, wherein the spring is coupled to an upper mounting surface of the strut body by a spring washer.

9. The strut assembly of claim 8, wherein the spring washer comprises a protrusion that projects outwardly of the pair of spaced apart sidewalls and resides within the angled notch of the mounting bracket.

10. The strut assembly of claim 9, wherein upon inward deflection of the strut toward the centerline of the trailer, the strut body moves inwardly and rotates at the connection between the strut body and the mounting bracket to cause the upper mounting surface of the strut body to deflect the spring.

11. The strut assembly of claim 1, wherein the strut body extends downwardly from the mounting bracket.

12. The strut assembly of claim 11, wherein the strut body comprises a panel support having a downwardly-projecting support member.

13. The strut assembly of claim 12, wherein the downwardly-projecting support member comprises a pair of spaced apart side walls coupled to the panel support.

14. The strut assembly of claim 5, wherein the spring is coupled to an upper surface of the strut body by a spring washer.

15. The strut assembly of claim 14, wherein the pair of spaced apart side walls of the mounting bracket each comprise an angled notch.

16. The strut assembly of claim 15, wherein a protrusion on the spring washer is received within the angled notch on the mounting bracket and configured to limit the rotation of the strut body inwardly towards the centerline of the trailer upon impact from a foreign member.

17. A strut assembly for mounting an aerodynamic fairing assembly for attachment to a trailer of a tractor-trailer having a centerline, transverse structural support members extending between sides of the trailer, longitudinal members extending along a length of the trailer and a mounting bracket comprising a mounting plate and a pair of spaced apart sidewalls, the strut assembly comprising:

a strut body rotatably configured to be coupled to the pair of spaced apart sidewalls on the mounting bracket; and a spring coupled to an upper surface of the strut body and configured to engage an underside of the mounting plate of the mounting bracket to resist inward deflection from an external force.

18. The strut assembly of claim 17, wherein the spring is coupled to an upper mounting surface of the strut body by a spring washer.

19. The strut assembly of claim 17, wherein upon inward deflection of the strut toward the centerline of the trailer, the strut body moves inwardly and rotates at the connection between the strut body and the mounting bracket to cause the upper mounting surface of the strut body to deflect the spring.

20. The strut assembly of claim 17, wherein the strut body extends downwardly from the mounting bracket.

21. The strut assembly of claim 17, wherein the strut body comprises a panel support having a downwardly-projecting support member.

22. The strut assembly of claim 21, wherein the downwardly-projecting support member comprises a pair of spaced apart side walls coupled to the panel support.

\* \* \* \* \*